US012798414B2

(12) United States Patent
Esteghlal

(10) Patent No.: US 12,798,414 B2
(45) Date of Patent: Nov. 17, 2026

(54) CONTROL APPARATUS FOR A DC-DC CONVERTER AND METHOD FOR ACTUATING A DC-DC CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 18/851,299

(22) PCT Filed: Feb. 1, 2023

(86) PCT No.: PCT/EP2023/052384
§ 371 (c)(1),
(2) Date: Sep. 26, 2024

(87) PCT Pub. No.: WO2023/186368
PCT Pub. Date: Oct. 5, 2023

(65) Prior Publication Data
US 2025/0222804 A1 Jul. 10, 2025

(30) Foreign Application Priority Data
Apr. 1, 2022 (DE) ..................... 10 2022 203 263.2

(51) Int. Cl.
*H02M 1/00* (2007.01)
*B60L 53/22* (2019.01)
*H02M 3/156* (2006.01)

(52) U.S. Cl.
CPC ........... *B60L 53/22* (2019.02); *H02M 1/0009* (2021.05); *H02M 3/156* (2013.01); *B60L 2210/10* (2013.01)

(58) Field of Classification Search
None
See application file for complete search history.

(56) References Cited

FOREIGN PATENT DOCUMENTS

| | | | | |
|---|---|---|---|---|
| CN | 106786737 A * | 5/2017 | | H02J 3/385 |
| DE | 102016200662 A1 | 7/2017 | | |
| DE | 102016215147 A1 * | 2/2018 | | H02M 1/44 |

OTHER PUBLICATIONS

S.R.H. Amrei et. al, High power DC-DC converters under large load and input voltage variations: a new approach, May 2005, 2005 International Power Engineering Conference, Date of Conference: Nov. 29, 2005-Dec. 2, 2005 (Year: 2005).*
Translation of International Search Report for Application No. PCT/EP2023/052384 dated Apr. 20, 2023 (2 pages).
Amrei et al., "High Power DC-DC Converters Under Large Load and Input Voltage Variations: A New Approach," International Power Engineering Conference, 2005, 6 pages.

* cited by examiner

*Primary Examiner* — Crystal L Hammond
*Assistant Examiner* — Seung Ho Choi
(74) *Attorney, Agent, or Firm* — Michael Best & Friedrich LLP

(57) ABSTRACT

The invention relates to the actuation of a DC-DC converter. A control variable of the DC-DC converter is formed as a combination of voltage regulation and current regulation. Thereby the maximum permissible current for the current regulation can be adjusted as a function of a momentary value of the input voltage on the DC-DC converter.

9 Claims, 2 Drawing Sheets

CONTROL APPARATUS FOR A DC-DC CONVERTER AND METHOD FOR ACTUATING A DC-DC CONVERTER

BACKGROUND

The present invention relates to a control apparatus for a DC-DC converter and a method for actuating such a DC-DC converter. The present invention further relates to a DC-DC converter apparatus, an apparatus for charging a link capacitor, in particular a link capacitor in a high-voltage network, as well as to an energy supply network and an electrical drive system for an electric vehicle.

Fully or at least semi-electrically powered vehicles have an electrical drive system that is powered by a traction battery. The electrical drive system as a rule comprises an electric machine and a power converter, in particular an inverter, wherein a so-called link capacitor is provided in the power converter in order to stabilize an input DC voltage. When switched off, the traction battery can be disconnected from the power converter of the electrical drive system by means of a circuit breaker. Before reconnecting the traction battery to the power converter, it is thereby desirable to charge the link capacitor in the power converter to a voltage level that at least approximately corresponds to the voltage level of the traction battery. An electrical connection can then be established between the traction battery and the power converter via the circuit breaker.

For example, DE 10 2016 200 662 A1 describes a bidirectional DC-DC converter for charging a link capacitor from a low-voltage battery If the low-voltage side, in particular a battery in the low-voltage network, is stressed too far in such a charging process for a link capacitor, the voltage level on the low-voltage side can drop. This can affect the functionality of consumers on the low-voltage side.

SUMMARY

The present invention discloses a control apparatus for a DC-DC converter and a method for actuating a DC-DC converter, a DC-DC converter apparatus, an apparatus for charging a link capacitor, as well as an energy supply network and an electrical drive system for an electric vehicle having the features of the disclosure.

The following is therefore provided:

A control apparatus for a DC-DC converter with a voltage control, a current control, and a monitoring device. The voltage control is configured so as to determine a first control variable for the DC/DC converter using a target value for the output voltage of the DC/DC converter and a measured value for the output voltage of the DC/DC converter. The current control configured so as to determine a second control variable for the DC-DC converter using a current control variable and a momentary current value of the DC-DC converter. The monitoring device configured so as to adjust the current control variable for the current control using a comparison of an input voltage of the DC-DC converter to a minimum target voltage, preferably to a predefined minimum target voltage. Furthermore, the control device is configured so as to actuate the DC-DC converter using a combination of the first control variable and the second control variable.

The following is furthermore provided:

A DC-DC converter apparatus with a DC-DC converter and a control apparatus according to the invention. The DC-DC converter is configured so as to be connected on the input-side to a DC power source. Furthermore, the DC-DC converter is configured so as to convert the DC voltage supplied on the input side into a further electric DC voltage and to provide it on the output side.

The following is furthermore provided:

An apparatus for charging a link capacitor in a high-voltage network, with a DC-DC converter apparatus according to the invention, wherein the link transformer is configured so as to be connected on the output side to a link capacitor of the high-voltage network.

In addition, the following is provided:

A power supply network for an electric vehicle with a high-voltage network, a low-voltage network, and an apparatus according to the invention for charging a link capacitor. The high-voltage network comprises a high-voltage battery, a link capacitor, and a circuit breaker. The circuit breaker is configured so as to open or close an electrical connection between the high-voltage battery and the link capacitor.

The following is furthermore provided:

An electrical drive system with a power supply network according to the invention, an electric machine, and an electric power converter. The power converter is configured so as to actuate the electrical machine using the electrical energy provided in the high-voltage network. Hereby the link capacitor of the high-voltage network can be provided in the electrical power converter, in particular.

Finally, the following is provided:

A method for actuating a DC-DC converter. The method comprises a step of determining a first control variable for the DC-DC converter. The first control variable is determined in particular using a target value for the output voltage of the DC-DC converter and a measured value for the output voltage of the DC-DC converter. Furthermore, the method comprises a step of determining a second control variable for the DC-DC converter. The second control variable is determined in particular using a current control variable and a momentary current value of the DC-DC converter. Furthermore, the method comprises a step of adjusting the current control variable for the current control. The current control variable is in particular adjusted using a comparison of an input voltage of the DC-DC converter to a minimum target voltage. Finally, the method comprises a step of driving the DC-DC converter using a combination of the first control variable and the second control variable.

The present invention is based on the finding that power transmission through a DC-DC converter from an input side to an output side of the DC-DC converter can result in a voltage drop on the input side as a function of the power transmitted through the DC-DC converter. In particular, when there are still other consumers connected to a power system that feeds the input side of the DC-DC converter, this can impair the functionality of these other consumers.

It is therefore an idea of the present invention to take this realization into account and to provide an operation of a DC-DC converter in which excessive voltage drops in a power supply network from which the DC-DC converter draws its power can be avoided. For this purpose, it is provided that a voltage regulation for the output voltage of the DC-DC converter is combined with a current regulation for the regulation of the DC-DC converter, wherein the current regulation takes into account the level of an input voltage of the DC-DC converter. Preferably, the input voltage is determined or measured, preferably by means of a voltage measuring device. In this way, it is possible to limit the electric current in the DC-DC converter when the electric voltage at the input of the DC-DC converter drops and thereby to prevent the voltage level on the input side of the DC-DC converter from dropping too much.

With the concept according to the invention, it is possible to combine a voltage regulation of the DC-DC converter with a current regulation in order to provide a desired voltage level on the output side. The current regulation used hereby can on the one hand be used in order to regulate a maximum electrical current in the DC-DC converter and thereby in particular to limit it to a maximum value. In this way, an overloading of the DC-DC converter can be avoided if too high of an electrical power would be called up from the input side due to the voltage regulation. In addition, according to the present invention, it is provided that the current regulation is supplemented with a further aspect, and a voltage level on the input side of the DC-DC converter is taken into account in the current regulation. In this way, the electric current in the DC-DC converter, and thus the electrical power called up at the input side of the DC-DC converter, can be controlled and in particular limited, if the DC-DC converter power consumption would cause the input side to be stressed so much that the input voltage drops too far.

Especially for a charging of a capacitor on the output side of a DC-DC converter, for example a link capacitor, as used for inverters in electric drive systems, a high power demand can occur at the beginning of the charging process. In some cases, this power demand can only be met to a limited extent by a battery that feeds the input side of the DC-DC converter. This can cause too great of a voltage drop. These voltage drops can lead to further consumers, which are also supplied by a power system at the input of the DC-DC converter, being impaired in their function. By limiting the electrical current through the DC-DC converter as a function of the input voltage, it can thereby be ensured that a power supply network at the input of the DC-DC converter always maintains a voltage level that allows the reliable function of the further consumers on this power supply network.

According to one embodiment, the monitoring device is configured so as to reduce a predefined value for the maximum current control variable if the input voltage of the DC-DC converter falls below a predefined value. If the input DC voltage drops below a minimum permissible value, this can be considered an indication that the power source on the input side of the DC-DC converter is overloaded by the power demand of the DC-DC converter. In this case, the operation of further consumers on the input side of the DC voltage as a load cannot be reliably ensured.

According to one embodiment, the current control is configured so as to output a control signal if the current control is active in an operating mode in which a maximum current in the DC-DC converter is limited. Hereby the voltage control is configured so as to adjust the second control variable using the control signal from the current control. This way, it can be reported to the voltage control whether or not the current control is actively engaging with the control variable. As a result, opposing control operations can be avoided. In particular, this can counteract an oscillation of the control system.

According to one embodiment, the control device is configured so as to output a duty cycle for a pulse width modulation as a control variable for actuating the DC/DC converter. This allows for a pulse width modulated actuation of the DC/DC converter in a simple manner.

The above designs and further developments can be combined with one another in any desired manner insofar as advantageous. Additional designs, further developments, and implementations of the invention also include inventive feature combinations not described or explicitly specified hereinabove or hereinafter with respect to exemplary embodiments. The skilled person will in particular also add individual aspects as improvements or additions to the respective basic forms of the invention.

BRIEF DESCRIPTION OF THE DRAWINGS

Further features and advantages of the invention are explained hereinafter with reference to the drawings. Shown are.

In the drawings, identical reference numbers denote identical or functionally identical components, unless stated otherwise.

DETAILED DESCRIPTION

Figure 1:
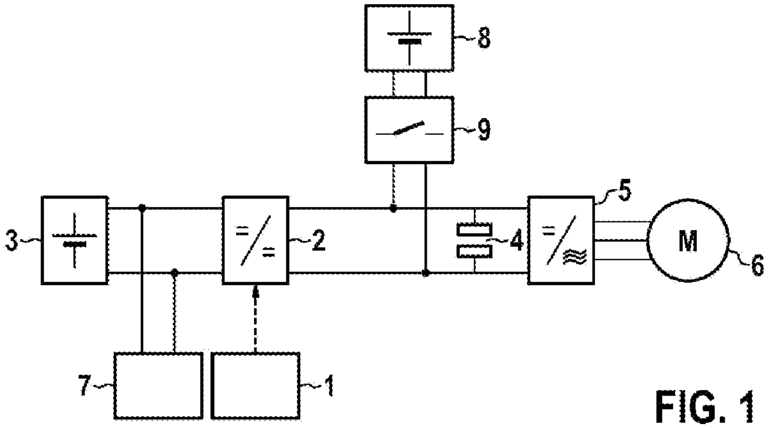
FIG. 1: a schematic view of a block diagram of an electric drive system with a control apparatus according to one embodiment.

FIG. 1 shows a schematic view of a block diagram of an electric drive system as can be used, for example, in a motor vehicle that is fully or at least semi-electrically propelled. The electric drive system comprises an electric machine 6. This electric machine 6 can be supplied, for example, with electrical power from an electric power converter 5. For this purpose, the electric power converter 5 can convert an electrical DC voltage supplied on the input side into a single-phase or multi-phase AC electric voltage in order to actuate the electric machine 6 according to a predefined torque, a predefined speed, or another predefined target value. On the input side, the electric DC voltage can be provided by a high-voltage network. For example, this high-voltage network can be provided by a battery 8, for example a traction battery. The battery 8 can be electrically connected to or disconnected from the remaining components of the high-voltage network by means of a circuit breaker 9.

A link capacitor 4 is provided at the input of the power converter 5 in order to stabilize the DC voltage. In the switched-off state, this link capacitor 4 as a rule is discharged, and the circuit breaker 9 is opened. To switch on, this circuit breaker 9 is closed. Prior to closing the circuit breaker 9, the link capacitor 4 is initially recharged to a voltage level corresponding at least approximately to the voltage level of the battery 8. In this way, high electrical equalizing currents can be avoided when closing the circuit breaker 9.

To charge the link capacitor 4, a DC-DC converter 2 is provided, which charges the link capacitor 4 by means of electrical energy from a low-voltage network with a corresponding battery 3. The operation of the DC-DC converter 2 is thereby controlled by means of a control apparatus 1. Furthermore, additional consumers 7 can be connected to the low-voltage network, if necessary.

In the following, the functional principle of the control apparatus 1 for charging the link capacitor 4 from the low-voltage network is explained in more detail.

Figure 2:
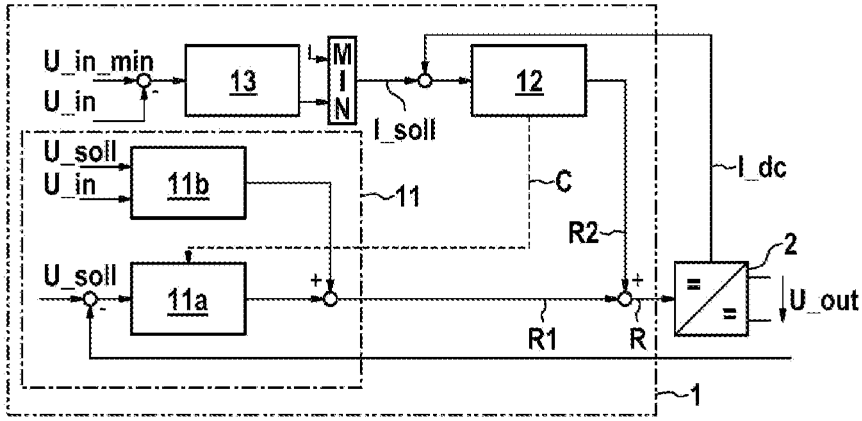
FIG. 2: a schematic view of a DC-DC converter apparatus with a control apparatus according to one embodiment.

FIG. 2 shows a schematic block diagram that forms the basis for a DC-DC converter apparatus with a control device 1 and a DC-DC converter 2 according to one embodiment. The DC-DC converter 2 hereby converts a DC voltage U_in supplied on the input side into an output DC voltage U_out, which can be used in order to charge the link capacitor 4, for example. Hereby a control variable R, for example in the form of a duty cycle for a pulse width modulated (PWM) actuation, can be provided to the DC-DC converter 2. The basic principle of a DC-DC converter with pulse width modulated actuation is hereby assumed to be known and will not be explained in further detail.

The control variable R for the DC-DC converter 2 can be provided, for example, by means of the control device 1. The control device 1 can comprise a voltage control 11 and a current control 12.

The voltage control 11 generates a first control variable R1. For this purpose, the voltage control 11 compares a value of the output DC voltage U_out to a predefined target value U_soll. For example, this target value U_soll can be a value for the target voltage to which the link capacitor 4 is to be charged. In addition to the actual voltage control 11*a*, the voltage control 11 can also comprise a further pre-control 11*b*. This pre-control 11*b* can, for example, determine a control component based on the input DC voltage U_in, the target voltage U_soll, as well as optionally electrical currents at the input and/or output of the DC-DC converter. As shown in FIG. 2, this control component can be combined with the control component of the actual voltage control 11*b* in order to obtain the first control variable R1.

The current control 12 generates a second control variable R2, which is determined, for example, on the basis of the electric current l_dc in the DC-DC converter 2. For this purpose, the input current, the output current of the DC-DC converter 2, or an internal current in the DC-DC converter 2 can generally be considered. In particular, the current control 12 can determine the second control variable R2 using the electric current l_dc of the DC-DC converter 2 and a predefined target value l_soll. For example, the current control 12 can generate a second control variable R2, which is suitable for limiting the electrical current of the DC-DC converter 2 to a predefined maximum value. In this way, an overloading of the DC-DC converter 2 can be avoided. Accordingly, as long as the electrical current in the DC-DC converter 2 is below the permissible current, no limitation, or only a correspondingly restricted limitation, can be provided by the second control variable R2. In particular, the current control 12 can only be activated when the electric current in the DC-DC converter 2 is to be limited.

If the electric current in the DC-DC converter 2 is limited by the current control 2, this can be signaled by a corresponding signal C on the current control 12. In that case, the regulation of the current control 12 can be appropriately adjusted or deactivated.

The first control variable R1 from the voltage control 11 and the second control variable R2 from the current control 12 can be combined with one another, for example added, and the result can be provided as the control variable R to the DC-DC converter 2.

Furthermore, the control apparatus 1 comprises a monitoring device 13. This monitoring device 13 compares the momentary input DC voltage U_in on the DC-DC converter 2 to a predefined value U_in_min. In particular, this predefined value U_in_min can be a value for a minimum permissible electrical voltage in an electrical network, which is to provide the electrical voltage at the input of the DC-DC converter 2. For example, this minimum electrical voltage U_in_min can be a value that is at least required in order to ensure reliable operation of further electrical consumers 7 on the power supply network.

If the monitoring device 13 detects that the momentary input DC voltage U_in is approaching the minimum additional value U_in_min, or if it even falls below this value U_in_min, this can be considered an indication that the power supply network at the input of the DC-DC converter 2 is overly stressed by the power consumption of the DC-DC converter 2. In order to counteract such an excessive load, the monitoring device 13 can adjust, and in particular lower, the specification for the maximum permissible electrical current in the DC-DC converter 2. For this purpose, the monitoring device 13 can, for example, adjust the target value l_soll for the downstream current control 12.

Accordingly, the initial specification for the maximum electrical current in the DC-DC converter 2 or the target value adjusted by the monitoring device 13 can be provided on the current control 12 as the target value specification l_soll. Hereby in each case the lower of the two aforementioned values is provided on the current control 12 as a target value.

Figure 3:
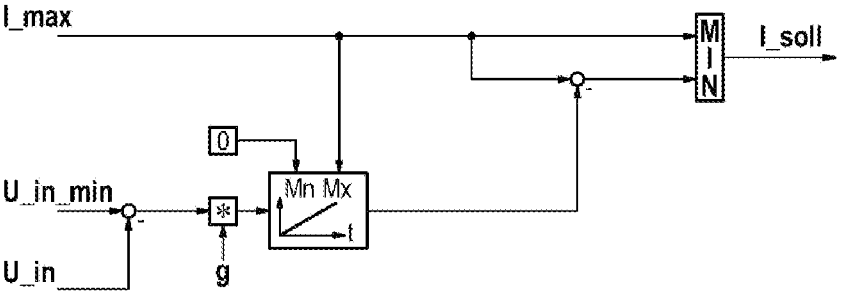
FIG. 3: a schematic view illustrating the functional principle of a monitoring apparatus for a control apparatus according to one embodiment.

FIG. 3 shows a schematic block diagram illustrating the function of a monitoring device 13 in a control apparatus 1, according to one embodiment.

For example, at the input of the monitoring device 13, a specification for the minimum permissible electric voltage U_in_min at the input of the DC-DC converter 2 as well as a current measured value U_in the electric voltage at the input of the DC-DC converter 2 can be provided. These can be compared to one another. For this purpose, for example, a difference of the momentary measured value U_in and the minimum additional value UJn_min can be formed. If necessary, this difference can be multiplied by a weighting factor g. Based on this result, an adjusted target value l_soll for the maximum permissible electrical current in the DC-DC converter 2 can be determined. For example, a functional connection can be determined over a range of values between 0 and the system-based maximum permissible current l_max in the DC-DC converter 2.

The lower value of the system-related maximum permissible current l_max for the DC-DC converter 2 versus the maximum permissible electrical current determined using the input DC voltage can then be provided as the target value l_soll to the current control 12.

Figure 4:
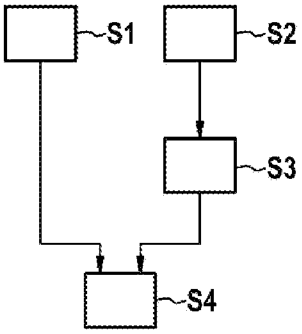
FIG. 4: a flow chart that forms the basis for a method according to one embodiment.

FIG. 4 shows a flowchart as it underlies a method for actuating a DC-DC converter 2 according to one embodiment. In principle, the procedure can comprise any of the steps already described above in connection with the control apparatus 1. Analogously, the control apparatus 1 described above can also comprise any desired and suitable components that are necessary for implementing the method described hereinafter.

In step S1, a first control variable R1 is determined for the DC-DC converter 2. The first control variable R1 is determined in particular using a target value U_soll for the output voltage of the DC-DC converter 2 and a measured value U_in for the output voltage of the DC-DC converter 2.

In step S2, a second control variable R2 for the DC-DC converter 2 is determined. The second control variable R2 is determined in particular using a current control variable l_soll and a momentary current value l_dc of the DC-DC converter 2.

In step S3, the current control variable l_soll is adjusted using a comparison of an input voltage U_in the DC-DC converter 2 to a minimum target voltage U_in_min.

Then, in step S4, the DC-DC converter 2 is finally actuated using a combination of the first control variable R1 and the second control variable R2.

In summary, the present invention relates to the actuation of a DC-DC converter. A control variable of the DC-DC converter is formed as a combination of voltage regulation and current regulation. Thereby the maximum permissible current for the current regulation can be adjusted as a function of a momentary value of the input voltage on the DC-DC converter.

The invention claimed is:

1. A control apparatus (1) for a DC-DC converter (2), with:

a voltage control (11) configured to determine a first control variable (R1) for the DC-DC converter (2) using a target value (U_soll) for an output voltage of the DC-DC converter (2) and a measured value (U_out) for the output voltage of the DC-DC converter (2);

a current control (12) configured to determine a second control variable (R2) for the DC-DC converter (2) using a current control variable (l_soll) and a momentary current value (l_dc) of the DC-DC converter (2); and a monitoring device (13) configured to adjust the current control variable (l_soll) defining a maximum permissible current for the current control (13) using a comparison of an input voltage (U_in) of the DC-DC converter (2) to a minimum target voltage (U_in_min), wherein the current control variable (l_soll) is adjusted by reducing the current control variable (l_soll) when the input voltage (U_in) approaches or falls below the minimum target voltage (U_in_min);

wherein the control device (1) is configured to actuate the DC-DC converter (2) using a combination (R) of the first control variable (R1) and the second control variable (R2).

2. The control apparatus (1) according to claim 1, wherein the monitoring device (13) comprises a control device configured so as to determine an internal control variable using a difference between the input voltage (U_in) of the DC-DC converter (2) and the minimum target voltage (U_in_min) and to output the internal control variable as a current control variable (l_soll) if the internal control variable falls below a predefined value.

3. The control apparatus (1) according to claim 1, wherein the current control (12) is configured to output a control signal (C) if the current control (12) is active in an operating mode in which a maximum current in the DC-DC converter (2) is limited, and wherein the voltage control (11) is configured to adjust the first control variable (R1) using the control signal (C) from the current control (12).

4. The control apparatus (1) according to claim 1, wherein the control apparatus (1) is configured to output a duty cycle for a pulse width modulation as a control variable for actuating the DC-DC converter (2).

5. A DC-DC converter apparatus, with:

a DC-DC converter (2) configured to be connected on an input side to a DC voltage source (3) and to convert the DC voltage (U_in) provided on the input side into a further electric DC voltage (U_out); and a control apparatus (1) according to claim 1.

6. An apparatus for charging a link capacitor (4) in a high-voltage network, with:

a DC-DC converter apparatus according to claim 5;

wherein the DC-DC converter (2) is configured to be connected on an output side to a link capacitor (4) of the high-voltage network.

7. An energy supply network for an electric vehicle, with:

a high-voltage network with a high-voltage battery (8), a link capacitor (4), and a circuit breaker (9), wherein the circuit breaker (9) is configured to close or open an electrical connection between the high-voltage battery (8) and the link capacitor (4);

a low-voltage network with a low-voltage battery (3); and an apparatus for charging the link capacitor (4) according to claim 6.

8. An electrical drive system, with:

a power supply network according to claim 7, an electric machine (6); and an electrical power converter (2) configured to control the electrical machine (6) using the electrical energy provided in the high-voltage network.

9. A method of actuating a DC-DC converter (2), the method comprising:

determining (S1) a first control variable (R1) for the DC-DC converter (2) using a target value (U_soll) for an output voltage of the DC-DC converter (2) and a measured value (U_out) for the output voltage of the DC-DC converter (2);

determining (S2) a second control variable (R2) for the DC-DC converter (2) using a current control variable (l_soll) defining a maximum permissible current and a momentary current value (l_dc) of the DC-DC converter (2);

adjusting (S3) the current control variable (l_soll) using a comparison of an input voltage (U_in) of the DC-DC converter (2) to a minimum target voltage (U_in_min); and actuating (S4) the DC-DC converter (2) using a combination (R) of the first control variable (R1) and the second control variable (R2), wherein the current control variable (l_soll) is adjusted by reducing the current control variable (l_soll) when the input voltage (U_in) approaches or falls below the minimum target voltage (U_in_min).

* * * * *